United States Patent
Wang (10) Patent No.: US 7,461,692 B1
(45) Date of Patent: Dec. 9, 2008

(54) MULTI-STAGE GAS SEPARATOR

(75) Inventor: Chengbao Wang, Oklahoma City, OK (US)

(73) Assignee: Wood Group ESP, Inc., Oklahoma City, OK (US)

( * ) Notice: Subject to any disclaimer, the term of this patent is extended or adjusted under 35 U.S.C. 154(b) by 157 days.

(21) Appl. No.: 11/409,429

(22) Filed: Apr. 21, 2006

Related U.S. Application Data (60) Provisional application No. 60/750,215, filed on Dec. 15, 2005.

(51) Int. Cl.
*E21B 43/38* (2006.01)
*B01D 19/00* (2006.01)

(52) U.S. Cl. .................... 166/105.5; 55/403; 95/261; 96/215; 96/216

(58) Field of Classification Search ............. 166/105.5; 55/345, 403, 402, 406; 95/261; 96/195, 96/207, 215, 216
See application file for complete search history.

(56) References Cited

U.S. PATENT DOCUMENTS

| | | | |
|---|---|---|---|
| 1,700,928 A | 2/1929 | Fawkes |
| 2,197,539 A | 4/1940 | Hickman |
| 4,231,767 A | 11/1980 | Acker |
| 4,366,861 A | 1/1983 | Milam |
| 4,378,290 A | 3/1983 | Kennedy, Jr. |
| 4,481,020 A | 11/1984 | Lee et al. |
| 4,828,036 A | 5/1989 | Simmons |
| 4,901,413 A | 2/1990 | Cotherman et al. |
| 4,913,630 A | 4/1990 | Cotherman et al. |
| 4,981,175 A | 1/1991 | Powers |
| 5,173,022 A | 12/1992 | Sango |
| 5,207,810 A | 5/1993 | Sheth |
| 5,431,228 A | 7/1995 | Weingarten et al. |
| 5,456,837 A | 10/1995 | Peachey |
| 5,482,117 A | 1/1996 | Kolpak et al. |
| 5,525,146 A | 6/1996 | Straub |
| 5,570,744 A | 11/1996 | Weingarten et al. |
| 5,634,963 A | 6/1997 | Strasser et al. |
| 5,653,286 A | 8/1997 | McCoy et al. |
| 5,888,053 A | 3/1999 | Kobayashi et al. |
| 5,902,378 A | 5/1999 | Obrejanu |
| 6,066,193 A | 5/2000 | Lee |
| 6,113,675 A | 9/2000 | Branstetter |
| 6,131,655 A | 10/2000 | Shaw |
| 6,155,345 A | 12/2000 | Lee et al. |
| 6,189,613 B1 | 2/2001 | Chachula et al. |
| 6,382,317 B1 | 5/2002 | Cobb |
| 6,494,258 B1 | 12/2002 | Weingarten |
| 6,702,027 B2 | 3/2004 | Olson et al. |
| 6,705,402 B2 | 3/2004 | Proctor |
| 6,723,158 B2 | 4/2004 | Brown et al. |
| 6,761,215 B2 | 7/2004 | Morrison et al. |
| 6,860,921 B2 | 3/2005 | Hopper |

*Primary Examiner*—Kenneth Thompson
(74) *Attorney, Agent, or Firm*—Crowe & Dunlevy, P.C.; David M. Sullivan (57) ABSTRACT

A gas separator is configured to separate gas from a two-phase fluid. The gas separator includes a rotatable shaft, a plurality of separation stages and an outer housing. Each of the plurality of separation stages includes a rotor connected to the rotatable shaft, a diffuser downstream from the rotor and a crossover downstream from the diffuser. Each crossover is configured to remove gas from its respective separation stage. The outer housing includes a separate group of discharge ports for each separation stage to permit the removal of gas from each separation stage.

13 Claims, 6 Drawing Sheets

MULTI-STAGE GAS SEPARATOR

RELATED APPLICATIONS

This application claims the benefit of U.S. Provisional Patent Application No. 60/750,215, filed Dec. 15, 2005, entitled Multi-Stage Gas Separator, the disclosure of which is claimed herein.

FIELD OF THE INVENTION

This invention relates generally to the field of downhole pumping systems, and more particularly to gas separators for separating gas from well fluid prior to pumping.

BACKGROUND

Submersible pumping systems are often deployed into wells to recover petroleum fluids from subterranean reservoirs. Typically, a submersible pumping system includes a number of components, including an electric motor coupled to one or more pump assemblies. Production tubing is connected to the pump assemblies to deliver the wellbore fluids from the subterranean reservoir to a storage facility on the surface.

The wellbore fluids often contain a combination of liquids and gases. Because most downhole pumping equipment is primarily designed to recover liquids, excess amounts of gas in the wellbore fluid can present problems for downhole equipment. For example, the centrifugal forces exerted by downhole turbomachinery tends to separate gas from liquid, thereby increasing the chances of cavitation or vapor lock.

Gas separators have been used to remove gas before the wellbore fluids enter the pump. In operation, wellbore fluid is drawn into the gas separator through an intake. A lift generator provides additional lift to move the wellbore fluid into an agitator. The agitator is typically configured as a rotary paddle that imparts centrifugal force to the wellbore fluid. As the wellbore fluid passes through the agitator, heavier components, such as oil and water, are carried to the outer edge of the agitator blade, while lighter components, such as gas, remain close to the center of the agitator. In this way, modern gas separators take advantage of the relative difference in specific gravities between the various components of the two-phase wellbore fluid to separate gas from liquid. Once separated, the liquid can be directed to the pump assembly and the gas vented from the gas separator.

While two or more prior art gas separators can be connected in tandem to improve the overall removal of gas from the produced fluid, the coupling that connects the shafts will create restriction and disturbance to the fluid flow. The restriction to the fluid flow detrimentally affects the gas separating performance of the system.

There is therefore a continued need for an improved gas separator design that more effectively and efficiently separates liquids from gases in a pumping system. It is to these and other deficiencies in the prior art that the present invention is directed.

SUMMARY OF THE INVENTION

In a preferred embodiment, the present invention includes a gas separator that is configured to separate gas from a two-phase fluid. The gas separator includes a rotatable shaft, a plurality of separation stages and an outer housing. Each of the plurality of separation stages includes a rotor connected to the rotatable shaft, a diffuser downstream from the rotor and a crossover downstream from the diffuser. Each crossover is configured to remove gas from its respective separation stage. The outer housing includes a separate group of discharge ports for each separation stage to permit the removal of gas from each separation stage.

DETAILED DESCRIPTION OF THE PREFERRED EMBODIMENT

As used herein, the term "petroleum" refers broadly to all mineral hydrocarbons, such as crude oil, gas and combinations of oil and gas. Furthermore, as used herein, the term "two-phase" refers to a fluid that includes a mixture of gases and liquids. It will be appreciated by those of skill in the art that, in the downhole environment, a two-phase fluid may also carry solids and suspensions. Accordingly, as used herein, the term "two-phase" not exclusive of fluids that contain liquids, gases, solids, or other intermediary forms of matter.

Figure 1:
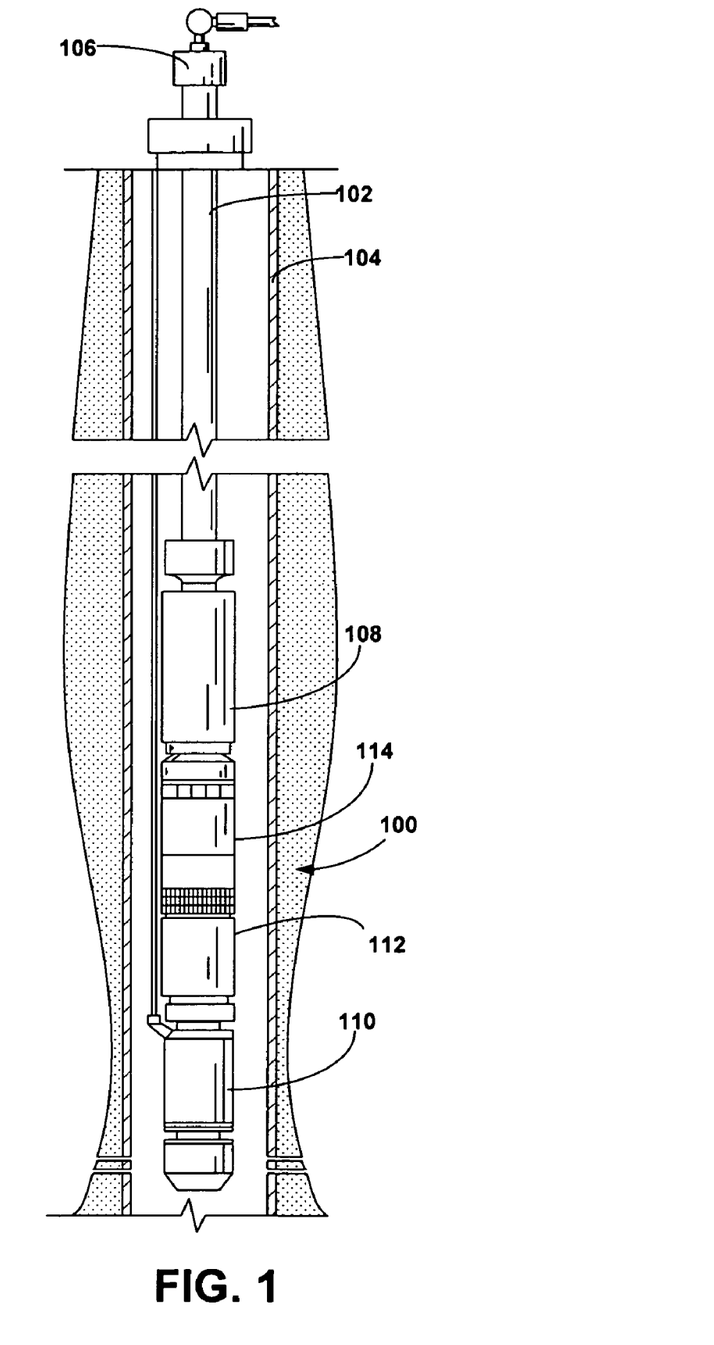
FIG. 1 is a side elevational view of a downhole pumping system constructed in accordance with a preferred embodiment.

In accordance with a preferred embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 preferably includes some combination of a pump assembly 108, a motor assembly 110, a seal section 112 and a gas separator 114. The seal section 112 shields the motor assembly 110 from mechanical thrust produced by the pump assembly 108 and provides for the expansion of motor lubricants during operation. The gas separator 114 is preferably connected between the seal section 112 and the pump assembly 108.

During use, wellbore fluids are drawn into the gas separator 114 where some fraction of the gas component is separated and returned to the wellbore 104. The de-gased wellbore fluid is then passed from the gas separator 114 to the pump assembly 108 for delivery to the surface through the production tubing 102. Although only one of each component is shown, it will be understood that more can be connected when appropriate. For example, in many applications, it is desirable to use tandem-motor combinations, multiple seal sections and multiple pump assemblies.

For the purposes of the disclosure herein, the terms "upstream" and "downstream" shall be used to refer to the relative positions of components or portions of components with respect to the general flow of fluids produced from the wellbore. "Upstream" refers to a position or component that is passed earlier than a "downstream" position or component as fluid is produced from the wellbore 104. The terms "upstream" and "downstream" are not necessarily dependent on the relative vertical orientation of a component or position. It will be appreciated that many of the components in the pumping system 100 are substantially cylindrical and have a common longitudinal axis that extends through the center of the elongated cylinder and a radius extending from the longitudinal axis to an outer circumference. Objects and motion may be described in terms of radial positions within discrete components in the pumping system 100.

Figure 2:
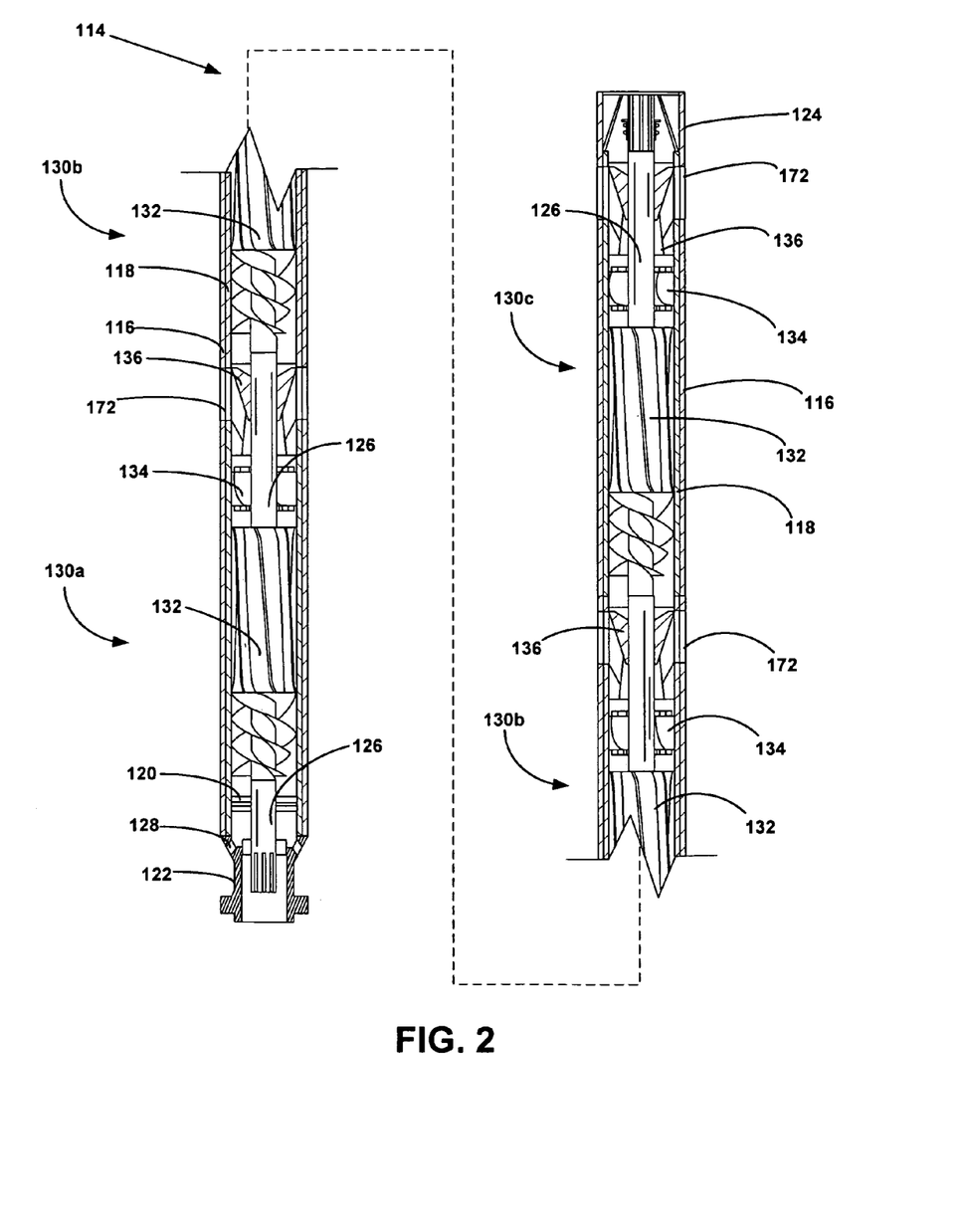
FIG. 2 is a partial cross-sectional view of a gas separator constructed in accordance with a preferred embodiment.

Turning now to FIG. 2, shown therein is a partial cross-sectional view of the gas separator 114. In the preferred embodiment, the gas separator 114 preferably includes an outer housing 116, a flow-through bearing 120, a base 122 and a head 124. The gas separator 114 also includes a shaft 126 that extends from the base 122 to the head 124. The base 122 includes intake ports 128 through which fluid is introduced into the gas separator 114. The outer housing 116 is preferably cylindrical and substantially unitary in construction.

The gas separator 114 preferably has one or more separation stages 130 ("stages 130"). In the particularly preferred embodiment shown in FIG. 2, the gas separator 114 includes a first stage 130a, a second stage 130b and a third stage 130c. It will be appreciated by those of skill in the art that additional or fewer stages 130 may used to address the requirements of a particular gas separation application. Each stage 130 preferably includes an inner housing 118, a rotor 132, a diffuser 134 and a crossover 136. In a presently preferred embodiment, the inner housing 118 is manufactured according to the length of each stage 130 and configured to reside inside the outer housing 116 in contact with the interior surface of the outer housing 116.

Figure 3:
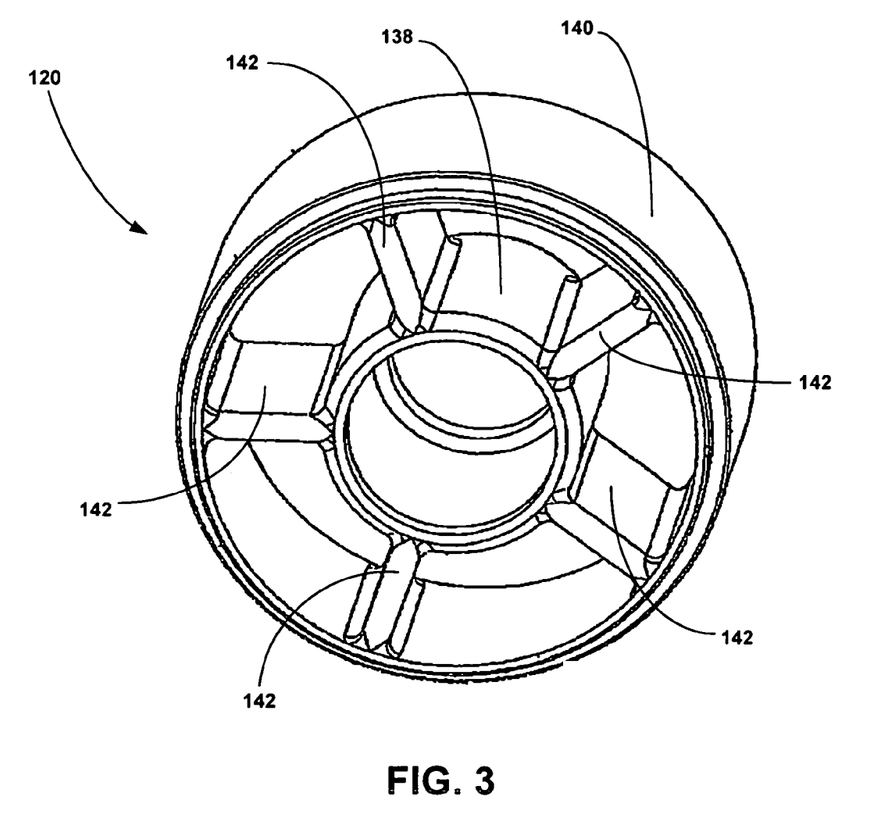
FIG. 3 is a perspective view of the upstream side of the flow-through bearing of the gas separator of FIG. 2.

Turning to FIG. 3, shown therein is a perspective view of the flow-through bearing 120. The flow-through bearing 120 preferably includes a flow-through bearing hub 138, a flow-through bearing rim 140 and a plurality of straight flow-through bearing vanes 142. The flow-through bearing hub 138 is preferably sized and configured to support the shaft 126 (not shown in FIG. 3), while the flow-through bearing rim 140 is sized and configured to fit within the inner housing 118. The flow-through bearing 120 is preferably secured in a stationary manner to the inner housing 118 adjacent the base 122.

The straight flow-through bearing vanes 142 connect the flow-through bearing hub 138 to the flow-through bearing rim 140. Although five flow-through bearing vanes 142 are shown in FIG. 3, it will be appreciated that greater or fewer numbers of flow-through bearing vanes 142 could also be employed. The flow-through bearing vanes 142 are configured to provide limited drag on fluids passing through the flow-through bearing 122. In this way, the flow-through bearing 120 supports and centers the shaft 126 while permitting fluids to pass with limited resistance.

Figure 4:
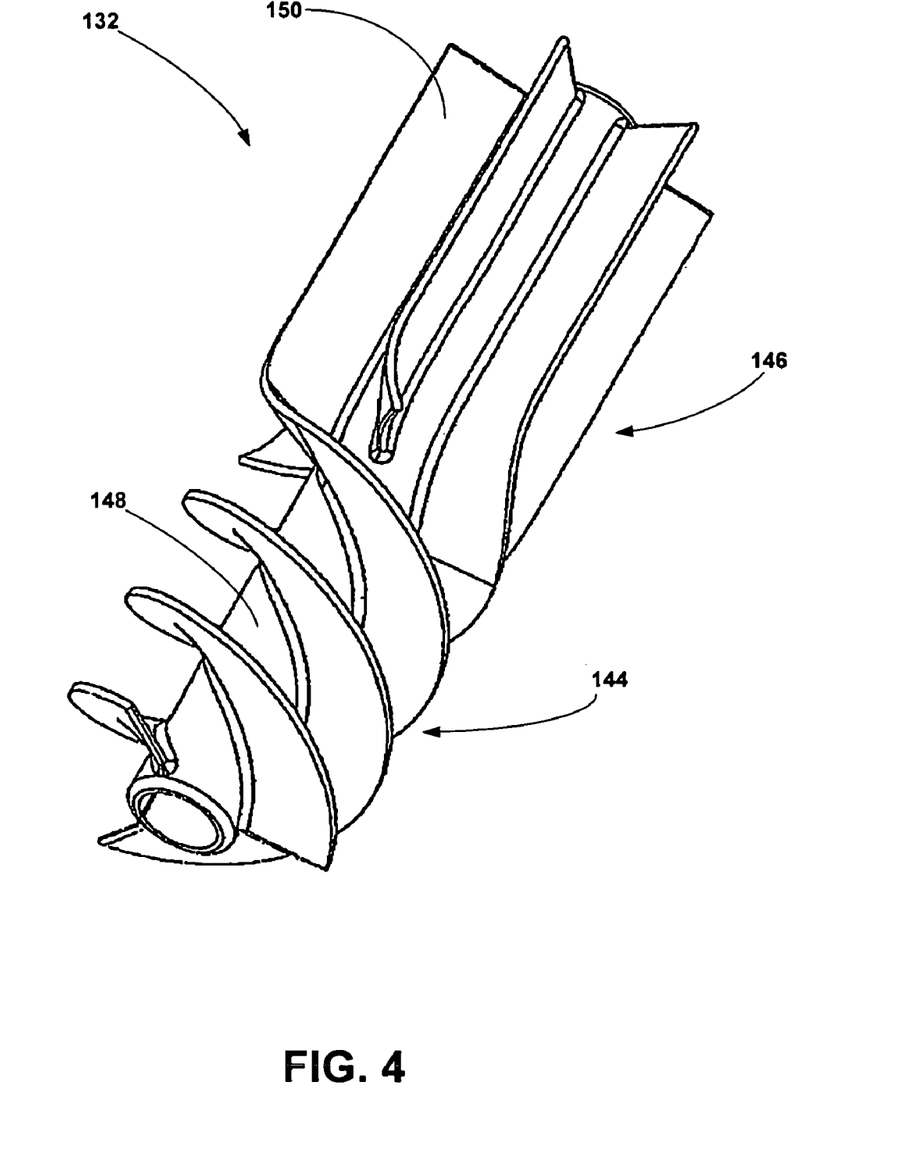
FIG. 4 is a side perspective view of the rotor of the gas separator of FIG. 2.

Turning to FIG. 4, shown therein is a perspective view of the rotor 132. The rotor 132 preferably includes an inducer 144, an impeller 146 and a rotor hub 148. The rotor hub 148 is configured for connection to the shaft 126 to cause the rotor 132 to rotate with the shaft 126. The rotor hub 148 can be secured to the shaft 126 with any suitable means, including press-fittings, keys or snap-rings. The rotor 132 is preferably secured to the shaft 126 in the upstream end of each stage 130.

In the presently preferred embodiment, inducer 144 is configured as a positive-displacement, screw-type pump that moves wellbore fluids from the inlet ports 128 to the impeller 146. The impeller 146 preferably has a plurality of paddles 150 that are designed to agitate the fluid passing through the gas separator 114 while the rotor 132 is spinning. The rotating action of the impeller 146 imparts energy to the fluid passing through rotor 132 and causes bubbles to precipitate from the wellbore fluid. In the particularly preferred embodiment, shown in FIG. 4, the rotor 132 includes six paddles 150, with each alternating paddle 150 being connected to a separate screw of the inducer 144.

Figure 5:
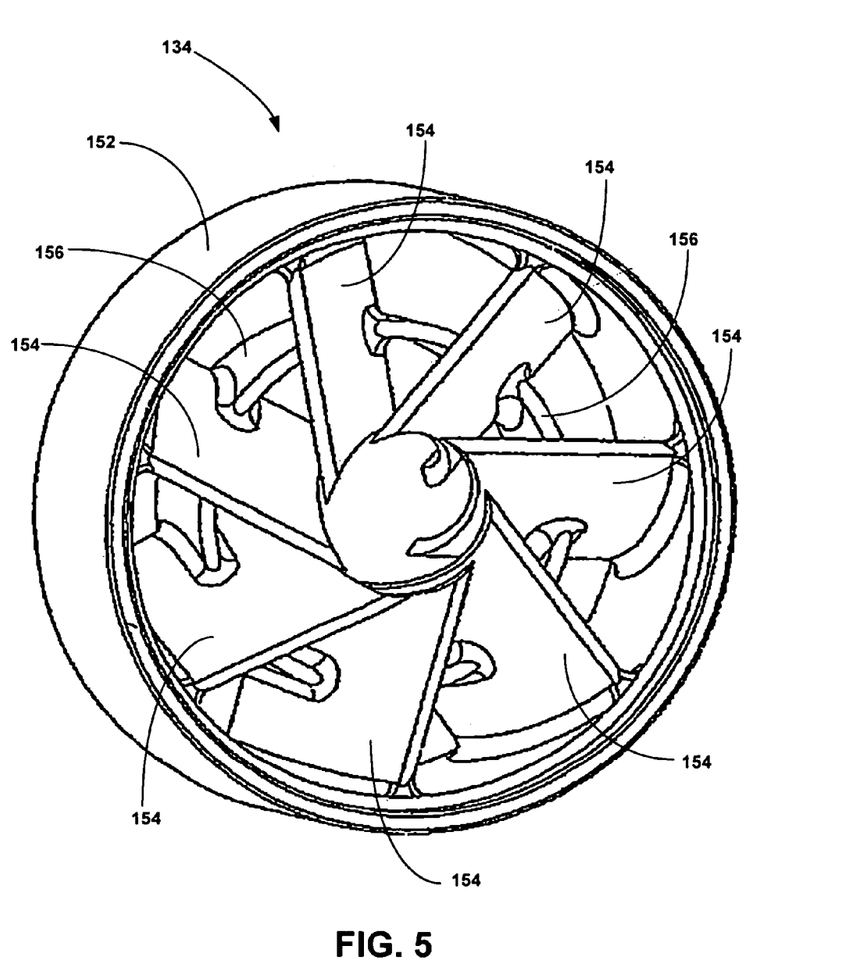
FIG. 5 is a perspective view of the upstream side of the diffuser of the gas separator of FIG. 2.

Turning now to FIG. 5, shown therein is a perspective view of the diffuser 134. The diffuser 134 includes a diffuser rim 152, a plurality of curved diffuser vanes 154 and a separation ring 156. The diffuser rim 152 is sized and configured to be stationarily secured within the inner housing 118 in a position downstream from the rotor 132. It will be appreciated by those of skill in the art that the diffuser rim 152 can be secured to the inner housing 118 through use of keys, press-fitting or other adhesive means.

The plurality of curved diffuser vanes 154 are designed with a curved face to condition the circular flow of fluid leaving the rotor 132. The flow profile leaving the diffuser 134 is substantially less turbulent with less rotation. In modifying the flow profile of the passing fluid, the diffuser 134 converts a portion of the dynamic energy imparted to the fluid by the rotor 132 into pressure head. A first end of each curved diffuser vane 154 is connected to the diffuser rim 152, while a second end of each curved diffuser vane 154 is unattached and terminates in a position proximate the rotatable shaft 126. In this way, the second end of the curved diffuser vane 154 is "free-floating."

Thus, unlike prior art diffusers, the diffuser 134 does not include a central hub. In this way, the shaft 126 passes through the middle of the diffuser 134 but is not in contact with any portion of the diffuser 134 during normal, intended use. In the absence of a hub on which the curved diffuser vanes 154 might otherwise terminate, the separation ring 156 is used to stabilize the curved diffuser vanes 154.

Figure 6:
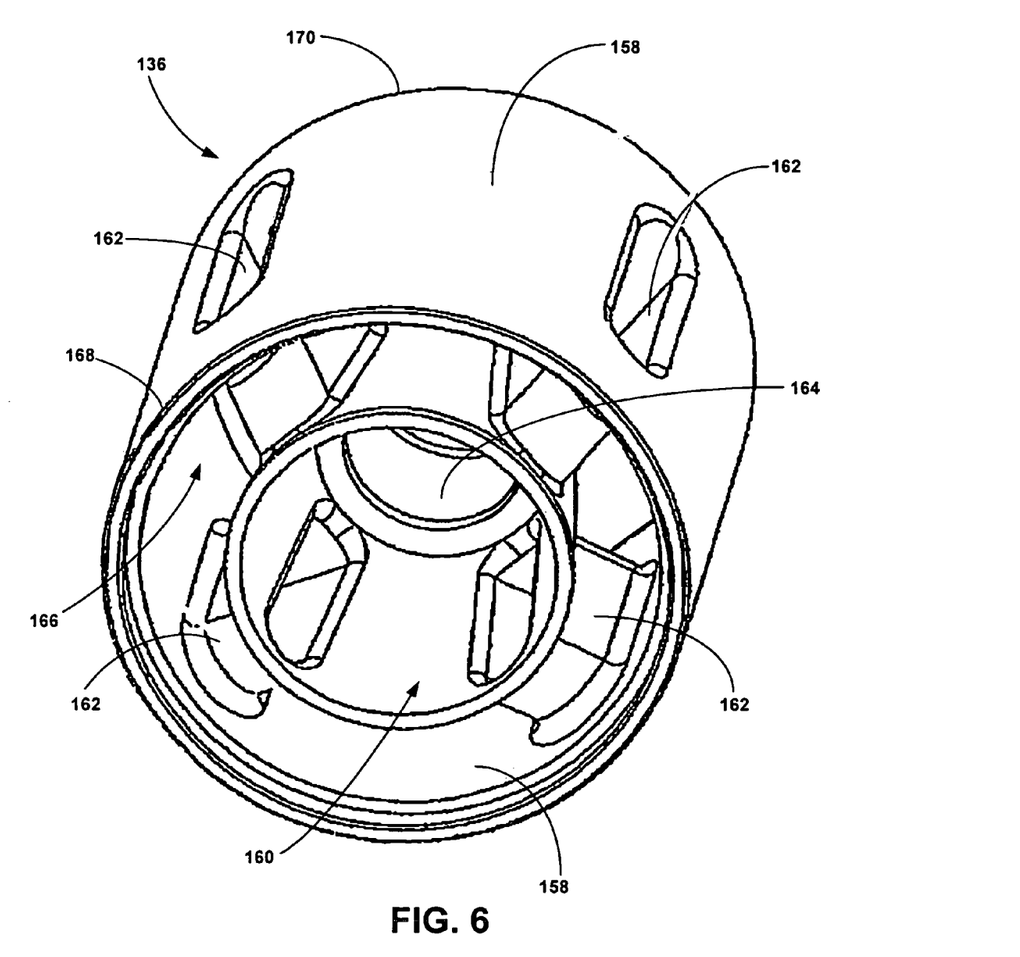
FIG. 6 is a perspective view of the upstream side of the crossover assembly of the gas separator if FIG. 2.

Turning next to FIG. 6, shown therein is a perspective view of the crossover 136. The crossover 136 is preferably positioned in close proximity with the downstream side of the diffuser 134. The crossover 136 includes an outer wall 158, an inner chamber 160, a plurality of gas ports 162 and a shaft support 164. The outer wall 158 is sized and configured to fit within the inner diameter of the inner housing 118. The annular space between the inner chamber 160 and the outer wall 158 defines a liquid path 166. The shaft 126 (not shown in FIG. 6) passes through the inner chamber 160 and through the shaft support 164. In the presently preferred embodiment, the exterior of the shaft 126 fits in close tolerance with the shaft support 164. In addition to stabilizing the shaft 126, the shaft support 164 acts with the shaft 126 to close the downstream end of the inner chamber 160.

The inner chamber 160 is preferably tapered from a larger diameter at an upstream end 168 to a smaller diameter at the downstream end 170. As the liquid path 166 gradually enlarges along the length of the crossover 136, the fluid velocity decreases and pressure increases to encourage the formation of larger sized bubbles, which are more easily separated in downstream stages 130.

The gas ports 162 are preferably manufactured as open-ended tubes that pass through the liquid path 166 from the inner chamber 160. The gas ports 162 preferably extend radially from the inner chamber 160 at a forward angle with respect to a longitudinal axis through the crossover 136. The angular disposition of the gas ports 162 improves the removal of gas moving through crossover 136. Although four gas ports 162 are presently preferred, it will be understood that alternate embodiments contemplate the use of additional or fewer gas ports 162.

The crossover 136 collects liquid from an outer radial portion of the gas separator 114 and directs the liquid through the liquid path 166 to downstream stages 130 or other downstream equipment, such as the pump assembly 108. Gas in a center radial portion of the gas separator 114 is captured by the crossover 136 and temporarily trapped in the inner chamber 160. The trapped gas is directed from the inner chamber 160 through the gas ports 162 to the exterior of the outer wall 158.

As shown in FIG. 2, at the points along the gas separator 114 where a crossover 136 is located, the inner housing 118 and outer housing 116 include discharge ports 172 that are aligned with the gas ports 162. The discharge ports 172 conduct the gas from the crossover 136 to the external environment through the inner housing 116 and outer housing 118. If multiple stages 130 are employed, the outer housing 118 will include separate groups of discharge ports 172 adjacent each set of gas ports 162 along the length of the outer housing 118.

Turning back to FIG. 2, it is significant that the gas separator 114 is configured as a modular design in which a plurality of stages 130 can be easily installed within the gas separator 114. Multiple stages 130 can be used without the need for obtrusive couplers between adjacent sections. The rotor 132 of each stage 130 can be connected to the common shaft 126. In a highly preferred embodiment, the use of multiple stages 130, each with a rotor 132, diffusers 134 and crossover 136, improves the overall extent to which gas is removed from the mixed flow entering the gas separator 114.

During use, two-phase wellbore fluids are drawn into the gas separator 114 through the intake ports 128 by the rotor 132. In some applications, the downstream pump assembly 108 may also contribute to the suction used to draw wellbore fluids into the gas separator assembly 114.

The two-phase wellbore fluids pass through the intake ports 128 and through the flow-through bearing 120. The flow-through bearing 120 stabilizes the turning shaft 126 while providing limited resistance to the movement of the two-phase fluid. The two-phase fluid enters the first stage 130a and is moved downstream by the inducer 144 and then agitated and energized by the impeller 146. The spinning impeller 146 imparts a rotational flow profile to the two-phase fluid in which heavier components separate from lighter components as dense fluids are drawn outward by centrifugal force. Lighter gas and two-phase fluids remain in the center of the first inner housing 116.

The rotating fluid continues its path through the first stage 130a and passes through the diffuser 134. The curved diffuser vanes 154 on the diffuser 134 reduce the rotation of the fluid as it enters the crossover 136. In the crossover 136, the gas and lighter components of the two-phase fluid are removed from the gas separator 114 through the gas ports 162. The liquids and heavier two-phase fluids pass through the liquid path 166 to the adjacent stage 130a.

The second and third stages 130b and 130c, respectively, operate in the same manner as the first stage 130a by successively separating and removing remaining quantities of gas from the two-phase fluid. The removal of gas at multiple points along the gas separator 114 greatly improves the efficiency of the separation.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A gas separator configured to separate gas from a two-phase fluid, the gas separator comprising:
    a rotatable shaft;
    a plurality of separation stages, wherein each separation stage comprises:
        a rotor connected to the rotatable shaft;
        a diffuser downstream from the rotor; and
        a crossover downstream from the diffuser, wherein each crossover is configured to remove gas from its respective separation stage;
    an outer housing, wherein the outer housing includes a separate group of discharge ports for each separation stage to permit the removal of gas from each separation stage
    a base;
    a head;
    intake ports adjacent the base; and
    a flow-through bearing downstream from the intake ports and upstream from the plurality of separation stages.

2. The gas separator of claim 1, wherein the rotor includes an inducer and an impeller.

3. The gas separator of claim 1, wherein the diffuser comprises:
    a diffuser rim; and
    a plurality of diffuser vanes, wherein a first end of each of the plurality of diffuser vanes is connected to the diffuser rim and a second end of each of the diffuser vanes is unattached and terminates in a position proximate the rotatable shaft.

4. The gas separator of claim 3, wherein the diffuser includes a separation ring that stabilizes the diffuser vanes during use.

5. The gas separator of claim 1, wherein the crossover comprises:
    an outer wall;
    an inner wall;
    and a shaft support configured to stabilize the rotatable shaft;
    a liquid path defined by the annular space between the outer wall and the inner wall; and
    an inner chamber defined by the space between the rotatable shaft and the inner wall.

6. The gas separator of claim 5, wherein the crossover further comprises a plurality of gas ports configured to conduct gas from the inner chamber through the outer wall.

7. A gas separator configured to remove gas from a two-phase fluid, the gas separator comprising:
    an outer housing;
    a flow-through bearing; and
    a diffuser, wherein the diffuser comprises:
        a diffuser rim;
        a plurality of diffuser vanes, wherein each of the plurality of diffuser vanes has a first end connected to the diffuser rim and a free-floating second end.

8. The gas separator of claim 7, wherein the gas separator further comprises:

a rotor upstream from the diffuser, wherein the rotor is configured to induce a rotational flow profile in the two-phase fluid; and crossover downstream from the diffuser, wherein the crossover is configured to capture gas present in a center radial portion of the gas separator while permitting fluid present in an outer radial portion of the gas separator to remain in the gas separator.

9. A submersible pumping system for use in a wellbore having two-phase fluids, the pumping system comprising:

a pump assembly;

a motor assembly;

a gas separator disposed between the pump assembly and the motor assembly;

a seal section disposed between the motor assembly and the gas separator; and wherein the gas separator comprises:

a base connected to the seal section;

a head connected to the pump assembly;

intake ports adjacent the base;

a rotatable shaft driven by the motor assembly;

a plurality of separation stages, wherein each separation stage comprises:

a rotor connected to the rotatable shaft, wherein the rotor includes an inducer and an impeller;

a diffuser downstream from the rotor; and a crossover downstream from the diffuser, wherein each crossover is configured to remove gas from its respective separation stage; and an outer housing, wherein the outer housing includes a separate group of discharge ports for each separation stage to permit the removal of gas from each separation stage.

10. The pumping system of claim 9, wherein the diffuser comprises:

a diffuser rim; and a plurality of diffuser vanes, wherein a first end of each of the plurality of diffuser vanes is connected to the diffuser rim and a second end of each of the diffuser vanes is unattached and terminates in a position proximate the rotatable shaft.

11. The pumping system of claim 10, wherein the diffuser includes a separation ring that stabilizes the diffuser vanes during use.

12. The pumping system of claim 9, wherein the crossover comprises:

an outer wall;

an inner wall;

and a shaft support configured to stabilize the rotatable shaft;

a liquid path defined by the annular space between the outer wall and the inner wall; and an inner chamber defined by the space between the rotatable shaft and the inner wall.

13. The pumping system of claim 12, wherein the crossover further comprises a plurality of gas ports configured to conduct gas from the inner chamber through the outer wall.

* * * * *